(12) United States Patent
Lin

(10) Patent No.: US 9,768,722 B1
(45) Date of Patent: Sep. 19, 2017

(54) REACTION FORCE COUNTERACTING DEVICE FOR A METROLOGY TOOL

(71) Applicant: HIWIN MIKROSYSTEM CORP., Taichung (TW)

(72) Inventor: Yun-Wei Lin, Taichung (TW)

(73) Assignee: Hiwin Mikrosystem Corp., Taichung (TW)

( * ) Notice: Subject to any disclaimer, the term of this patent is extended or adjusted under 35 U.S.C. 154(b) by 0 days.

(21) Appl. No.: 15/414,959

(22) Filed: Jan. 25, 2017

(51) Int. Cl.
| | |
|---|---|
| G05B 5/01 | (2006.01) |
| H02P 25/06 | (2016.01) |
| F16M 11/04 | (2006.01) |
| F16M 11/18 | (2006.01) |
| H02K 11/30 | (2016.01) |
| H02K 41/02 | (2006.01) |
| G03F 7/20 | (2006.01) |

(52) U.S. Cl.
CPC ........... *H02P 25/06* (2013.01); *F16M 11/043* (2013.01); *F16M 11/18* (2013.01); *G03F 7/70758* (2013.01); *G03F 7/70766* (2013.01); *H02K 11/30* (2016.01); *H02K 41/02* (2013.01)

(58) Field of Classification Search
CPC .. G03F 7/70758; G03F 7/70766; H02P 25/06; H02K 11/30; H02K 41/02; F16M 11/043; F16M 11/18

USPC ........ 248/550; 356/237.2, 603, 622; 355/53; 318/611
See application file for complete search history.

(56) References Cited

U.S. PATENT DOCUMENTS

| | | | | |
|---|---|---|---|---|
| 6,906,786 B2 * | 6/2005 | Cox | ......................... | B23Q 1/58 318/611 |
| 7,502,103 B2 * | 3/2009 | Plug | .................... | G03F 7/70758 318/611 |

* cited by examiner

*Primary Examiner* — Todd M Epps
(74) *Attorney, Agent, or Firm* — Rosenberg, Klein & Lee

(57) ABSTRACT

A reaction force counteracting device includes a mounting seat supported on a base seat by means of a vibration isolating assembly, a stage movably mounted on the mounting seat and actuated by a primary actuating member, and a holding table coupled with and movable relative to the stage for holding an object. A reaction force counteracting unit includes a counteraction actuating member coupled with the primary actuating member, and a counteraction moving member actuated by the counteraction actuating member to be moved in an opposite direction relative to an accelerated displacement of the primary actuating member made by a reaction force generated from movement of the stage. A control unit is electronically connected to the primary and counteraction actuating members to control the movement of the counteraction moving member.

7 Claims, 8 Drawing Sheets

REACTION FORCE COUNTERACTING DEVICE FOR A METROLOGY TOOL

FIELD

The disclosure relates to a metrology tool utilized in mechanical, electronic and optoelectronic industries for measuring an object held thereon, and more particularly to a reaction force counteracting device for a metrology tool.

BACKGROUND

Referring to FIG. 1, a conventional balance mass system 9, such as those disclosed in U.S. Pat. No. 6,906,786 B2 and U.S. Pat. No. 7,502,103 B2, generally includes a base frame 91, a balance mass 92 elastically coupled to and supported on the base frame 91, a substrate table 93 movably disposed on the balance mass 92 and actuated by an actuator 94 that is connected between the balance mass 92 and the substrate table 93, and a spring damper assembly 95 connected between the base frame 91 and the balance mass 92. During the movement of the substrate table 93 actuated by the actuator 94, a reaction force generated and applied to the balance mass 92 can be counteracted due to the mass of the balance mass 92 being significantly greater than that of the substrate table 93 and that of the actuator 94, and hence an accelerated displacement of the balance mass 92 due to the reaction force is greatly reduced. The displacement of the balance mass 92 can be further reduced by means of the spring damper assembly 95. The balance mass 92 as such is required to have a considerable weight to bear and counteract all reaction force generated by the movement of the substrate table 93 for ensuring stability, which renders the balance mass system 9 bulky and arrangement thereof troublesome.

SUMMARY

Therefore, an object of the disclosure is to provide a reaction force counteracting device that can alleviate at least one of the drawbacks of the prior art.

According to the disclosure, the reaction force counteracting device includes a base seat unit having a base seat, a stage mounting unit having a mounting seat which is disposed above and spaced apart from the base seat in an upright direction, and a vibration isolating assembly which interconnects the mounting seat and the base seat, and a movable stage unit mounted on the mounting seat. The movable stage unit includes a stage which is movable relative to the mounting seat, a primary actuating member which is disposed to actuate movement of the stage so as to generate a reaction force that is applied to the primary actuating member to make an accelerated displacement in an opposite direction relative to the movement of the stage, and a holding table which is coupled with the stage such that the holding table is movable with the movement of the stage and is movable relative to the stage. A reaction force counteracting unit includes at least one counteraction actuating member which is coupled with the primary actuating member, and at least one counteraction moving member which is disposed between the base seat unit and the counteraction actuating member and which is actuated by the counteraction actuating member to be moved in an opposite direction relative to the accelerated displacement of the primary actuating member so as to counteract the reaction force. A control unit is electronically connected with the primary actuating member and the counteraction actuating member, and is disposed to read time-variant positional data of the primary actuating member with respect to the stage, and of the counteraction actuating member with respect to the counteraction moving member, process the positional data into acceleration data, and control movement of the counteraction actuating member in accordance with the acceleration data.

BRIEF DESCRIPTION OF THE DRAWINGS

Other features and advantages of the disclosure will become apparent in the following detailed description of the embodiments with reference to the accompanying drawings, of which.

DETAILED DESCRIPTION

Figure 1:
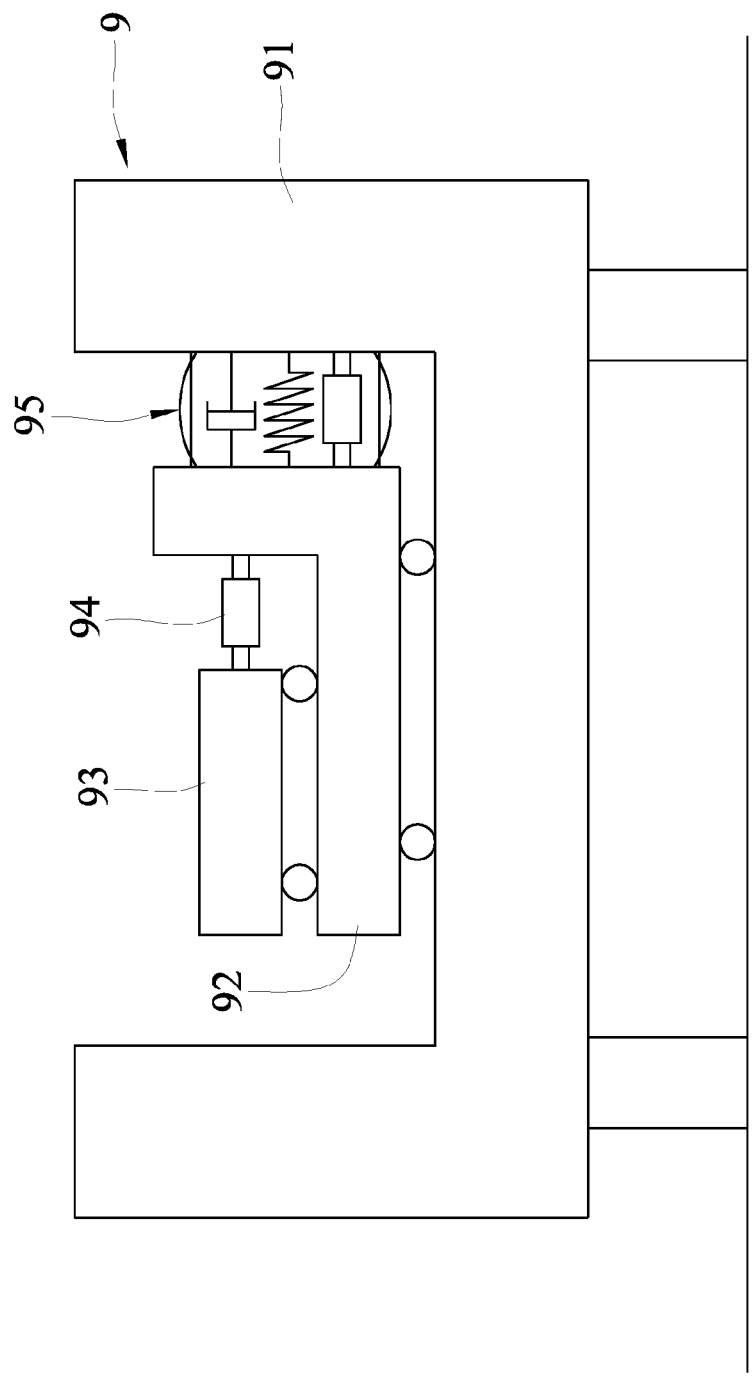
FIG. 1 is a schematic side view of a conventional balance mass system.

Before the disclosure is described in greater detail, it should be noted that where considered appropriate, reference numerals or terminal portions of reference numerals have been repeated among the figures to indicate corresponding or analogous elements, which may optionally have similar characteristics.

Referring to FIGS. 2 to 5, an embodiment of a reaction force counteracting device includes a base seat unit 1, a stage mounting unit 2, a movable stage unit 3, a reaction force counteracting unit 4 and a control unit 5.

The base seat unit 1 has a base seat 11 and two upright pedestals 12 disposed on and extending in an upright direction from two sides of the base seat 11. The base seat 11 has opposite top and bottom walls 112, 111.

The stage mounting unit 2 has a mounting seat 21 which is disposed above and spaced apart from the top wall 112 of the base seat 11 in the upright direction, and a vibration isolating assembly 22 which interconnects the mounting seat 21 and the base seat 11. The mounting seat 21 has a lower wall 211 confronting the top wall 112 of the base seat 11, an upper wall 212 opposite to the lower wall 211, two sliding recesses 213 extending from the upper wall 212 toward the lower wall 211, elongated in a first direction (X) (a fore-aft direction in this embodiment), and disposed opposite to each other in a second direction (Y) (a left-right direction in this embodiment) that is perpendicular to both the upright direction and the first direction (X), and two sliding rails 214 projecting upwardly from the upper wall 212, elongated in the first direction (X) and disposed laterally of the sliding recesses 213, respectively. In this embodiment, the vibration isolating assembly 22 includes four active vibration isolation bearings 221.

The movable stage unit 3 is mounted on the mounting seat 21, and includes an air bearing assembly 31, a stage 32, two primary actuating members 33, a holding table 34 and two secondary actuating members 35. The air bearing assembly 31 is disposed on the upper wall 212 of the mounting seat 21 such that the stage 32 and the holding table 34 are supported by the air bearing assembly 31 to movably float above the upper wall 212. The stage 32 has a stage body 321 which defines a sliding space 320 configured for accommodating and permitting movement of the holding table 34 in the second direction (Y), and two sliding blocks 322 respectively connected to two sides of the stage body 321 and slidably disposed in the sliding recesses 213, respectively. The primary actuating members 33 are held on and slidable along the sliding rails 214, respectively, and are respectively coupled with the sliding blocks 322 of the stage 32 so as to actuate movement of the stage 32 in the first direction (X). The holding table 34 is floatingly supported above the upper wall 212 of the mounting seat 21 and movably accommodated in the sliding space 320, and is movable with the movement of the stage 32 in the first direction (X). The secondary actuating members 35 are disposed on the stage body 321, and are respectively coupled with two sides of the holding table 34 so as to actuate the holding table 34 to move relative to the stage 32 in the second direction (Y). In this embodiment, the air bearing assembly 31 has a plurality of air bearings 311 which are disposed at four corners of the holding table 34, at four corners of the stage body 321, and between each of the sliding blocks 322 and the mounting seat 21. Each of the primary and secondary actuating members 33, 35 is a linear servo motor.

The reaction force counteracting unit 4 is connected between the base seat unit 1 and the movable stage unit 3, and includes two counteraction actuating members 41 which are securely connected to the primary actuating members 33, respectively, and two counteraction moving members 42, each of which is connected between a respective one of the counteraction actuating members 41 and a respective one of the upright pedestals 12. The counteraction moving members 42 are actuated by the counteraction actuating members 41, respectively, to be moved in the first direction (X) so as to drive movement of the primary actuating member 33 in an opposite direction relative to an accelerated displacement of the primary actuating member 33 caused by a reaction force that is applied to the primary actuating member 33 so as to counteract the reaction force. In this embodiment, each of the counteraction actuating members 41 is a linear servo motor.

Figure 5:
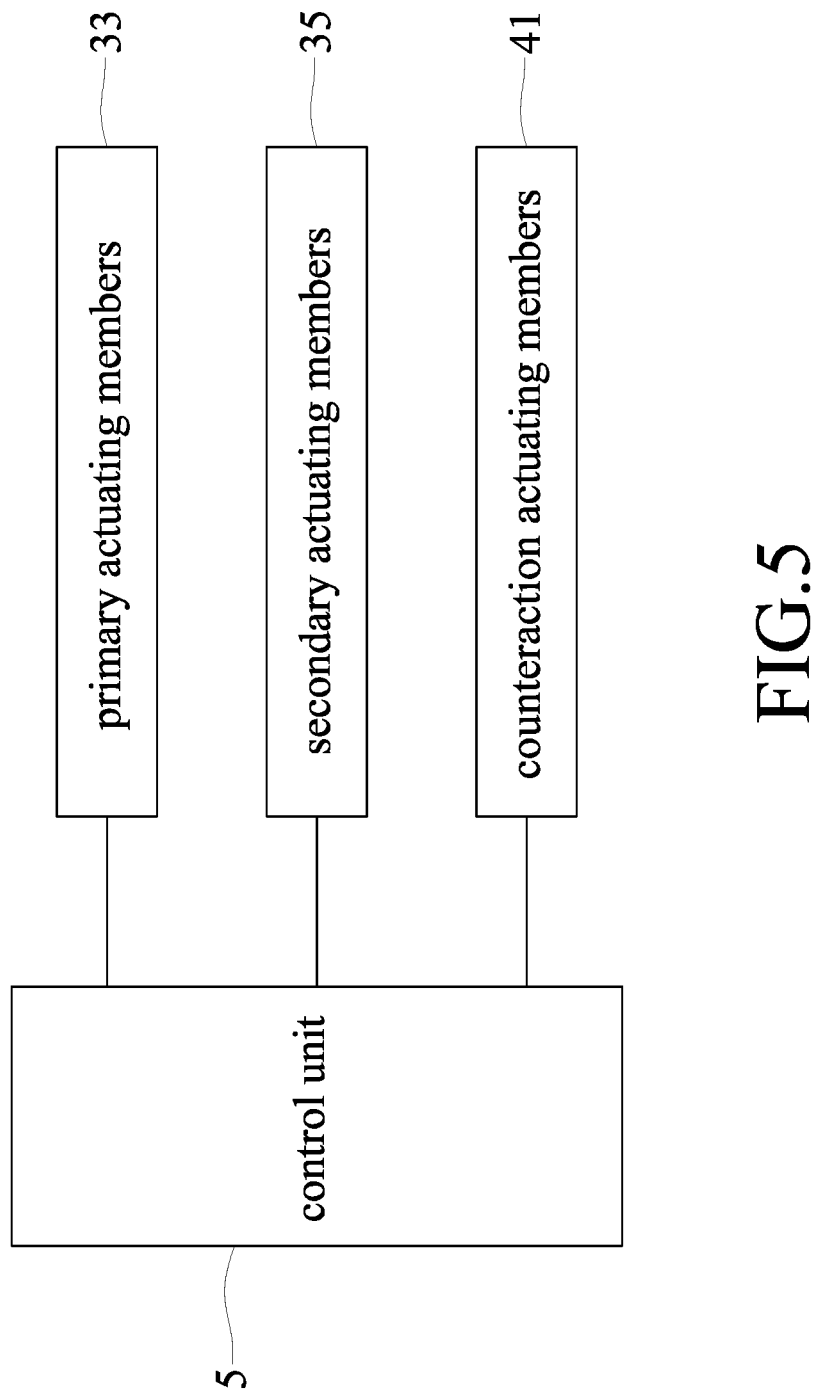
FIG. 5 is a block diagram illustrating a control unit of the embodiment and actuating members electronically connected thereto.

Referring to FIG. 5, the control unit 5 is electronically connected with each of the primary and counteraction actuating members 33, 41 to control the actuation of the actuating members 33, 41. The control unit 5 is disposed to read time-variant positional data of the primary actuating members 33 with respect to the stage 32, of the secondary actuating members 35 with respect to the holding table 34, and of the counteraction actuating members 41 with respect to the counteraction moving members 42, process the positional data into acceleration data, and control the movements of the counteraction actuating members 41 in accordance with the acceleration data. In this embodiment, the control unit 5 is in the form of a computer.

Figure 2:
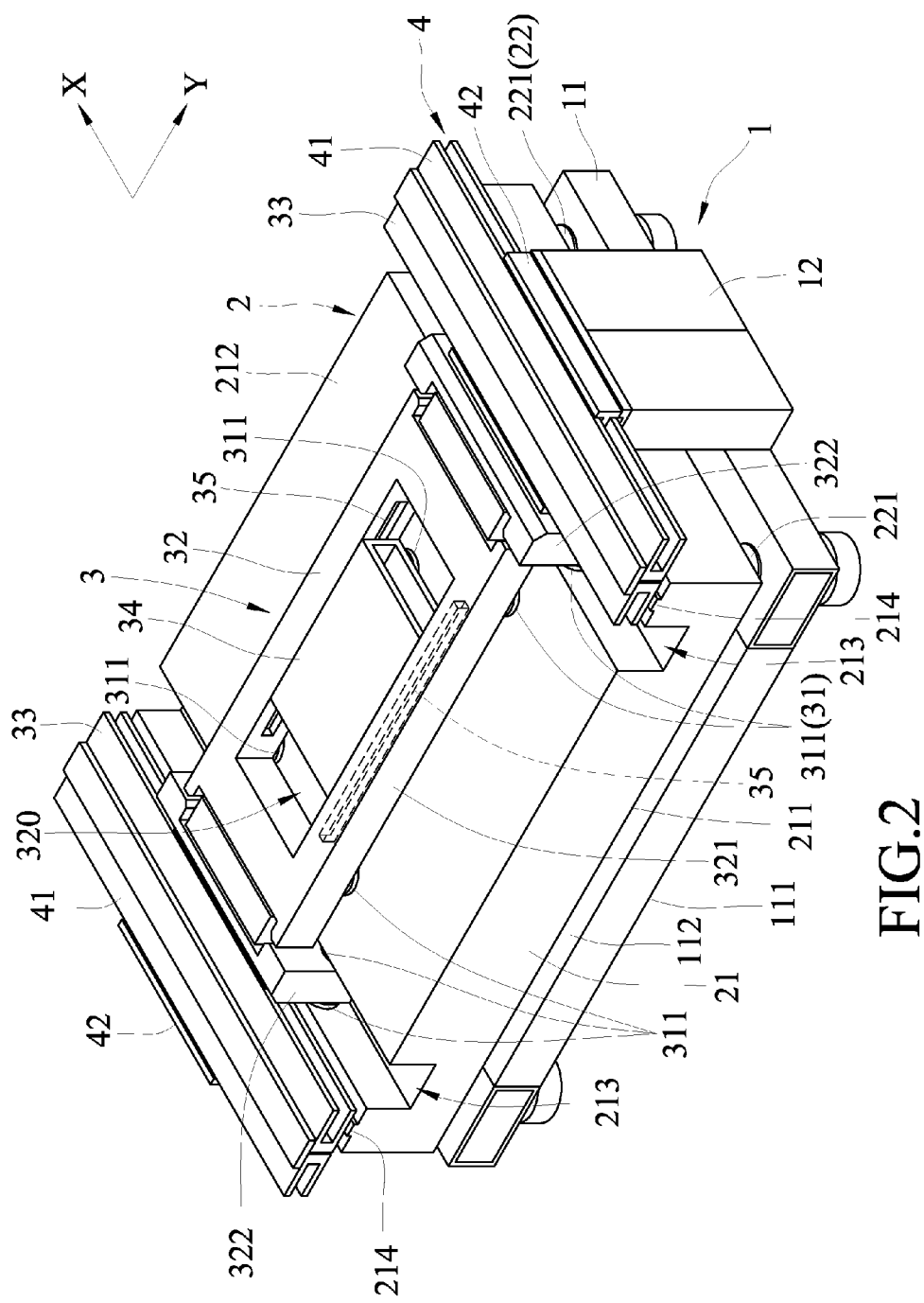
FIG. 2 is a perspective view of an embodiment of a reaction force counteracting device according to the disclosure.
Figure 3:
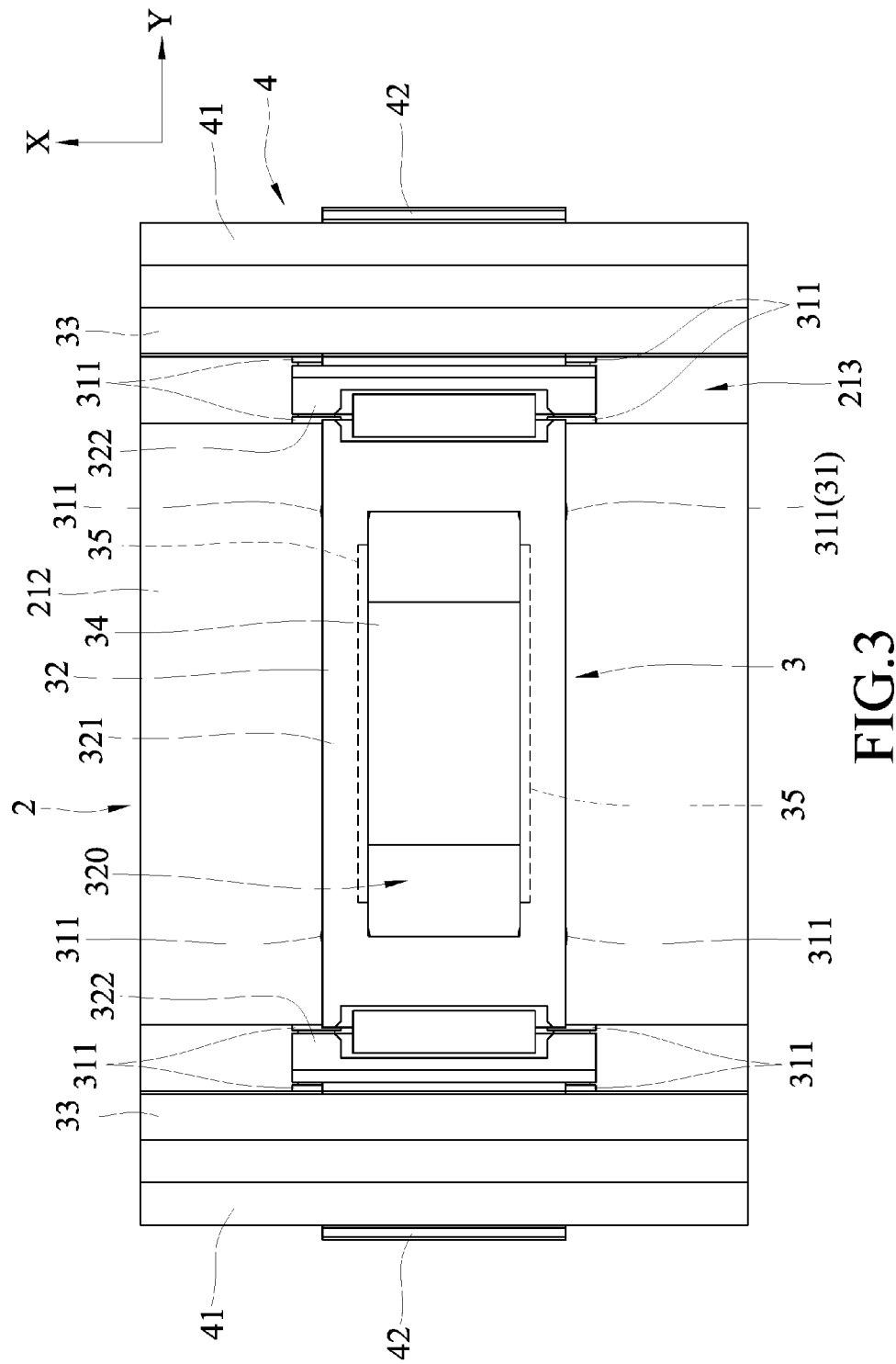
FIG. 3 is a schematic top view of the embodiment.
Figure 4:
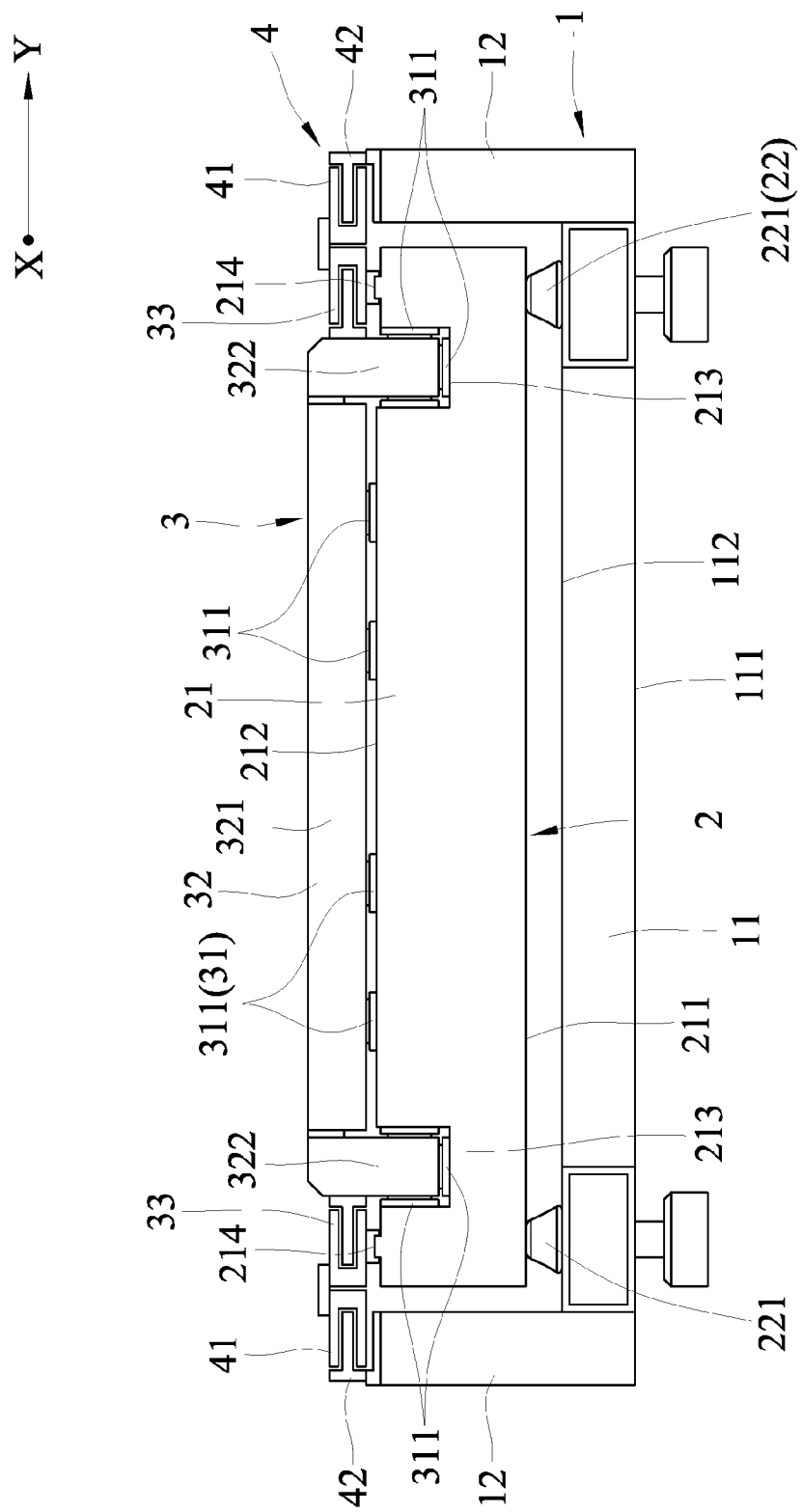
FIG. 4 is a schematic side view of the embodiment.

Referring to FIGS. 2 and 5, when the primary actuating members 33 are operated to actuate the movement of the stage 32 in the first direction (X), and a reaction force is generated and immediately applied to the primary actuating members 33 to make an accelerated displacement in an opposite direction relative to the movement of the stage 32, the control unit 5 controls and operates the counteraction actuating members 41 to actuate the movement of the counteraction moving members 42 so as to generate a counteraction force against the accelerated displacement of the primary actuating members 33 to thereby counteract the reaction force. Particularly, the control unit 5 can instantaneously calculate in accordance with the acceleration data of the primary actuating members 33 to control the movement of the counteraction actuating members 41 so as to perform a reaction force absorbing (like a biasing spring) and damping (rapid convergence) effect.

The reaction force which is generated as a result of the movement of the holding table 34 in the second direction (Y) actuated by the secondary actuating members 35 and which is acted on the stage 32 can be counteracted by the air bearings 311 disposed on the sliding blocks 322 so as to reduce impact of the reaction force on the mounting seat 21. In this embodiment, thus, the reaction force counteracting unit 4 is designed to counteract the reaction force generated by the movement of the stage 32 without having to counteract the reaction force generated by the movement of the holding table 34.

It is noted that the numbers of the counteraction actuating and moving members 41, 42 and of the primary and secondary actuating members 33, 35 of the movable stage unit 3 may be changed depending on different needs, e.g., only one or at least three.

As illustrated, with the reaction force counteracting unit 4 which can counteract the reaction force generated during the movement of the stage 32 actuated by the primary actuating members 33, no accelerated displacement of the primary actuating members 33 occurs to impact upon the mounting seat 21, thereby greatly enhancing the stability of the mounting seat 21. Hence, the mounting seat 21 can be made compact to accommodate various arrangement requirements of the components of the reaction force counteracting device.

Figure 6:
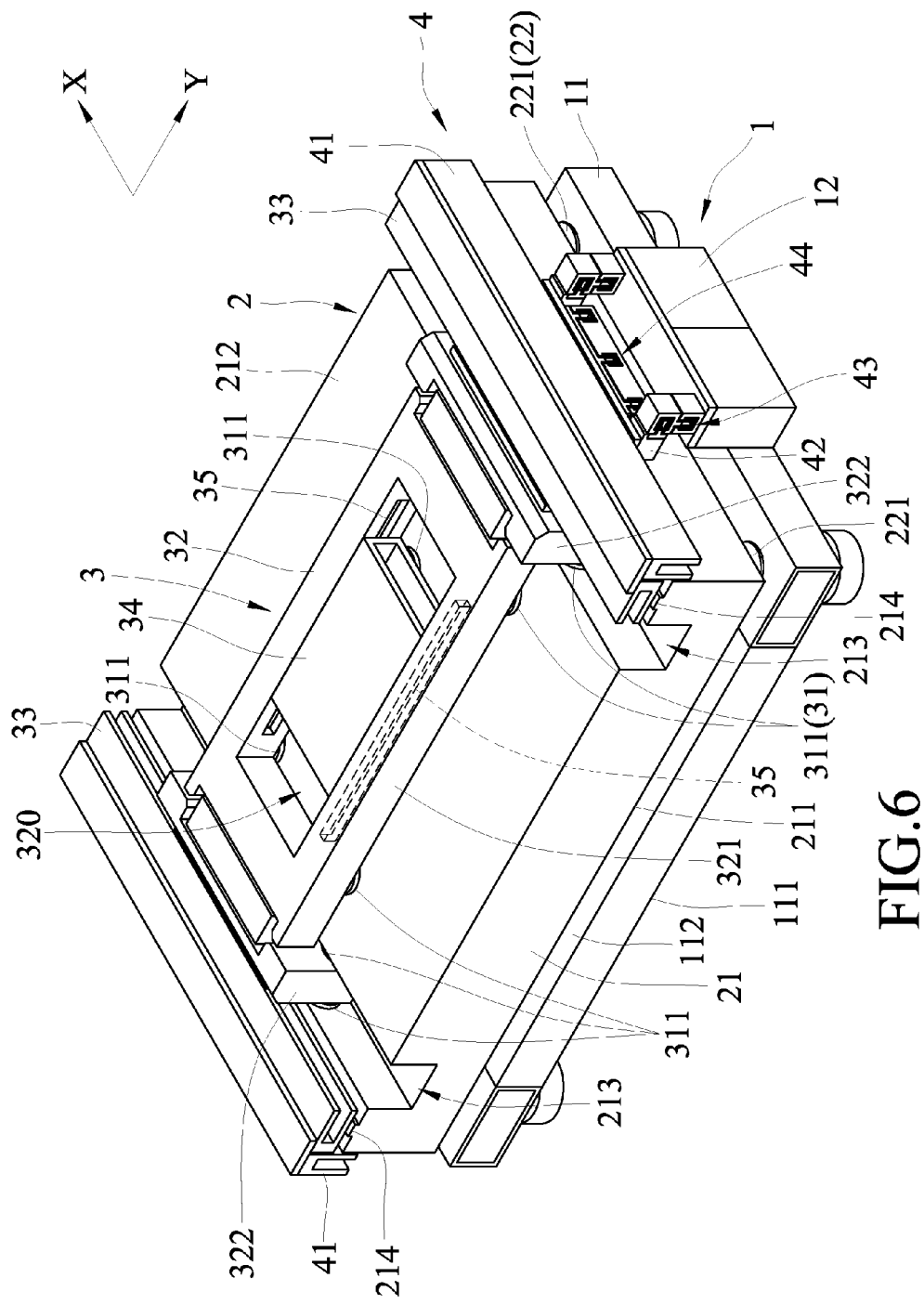
FIG. 6 is a perspective view of another embodiment of a reaction force counteracting device according to the disclosure.
Figure 7:
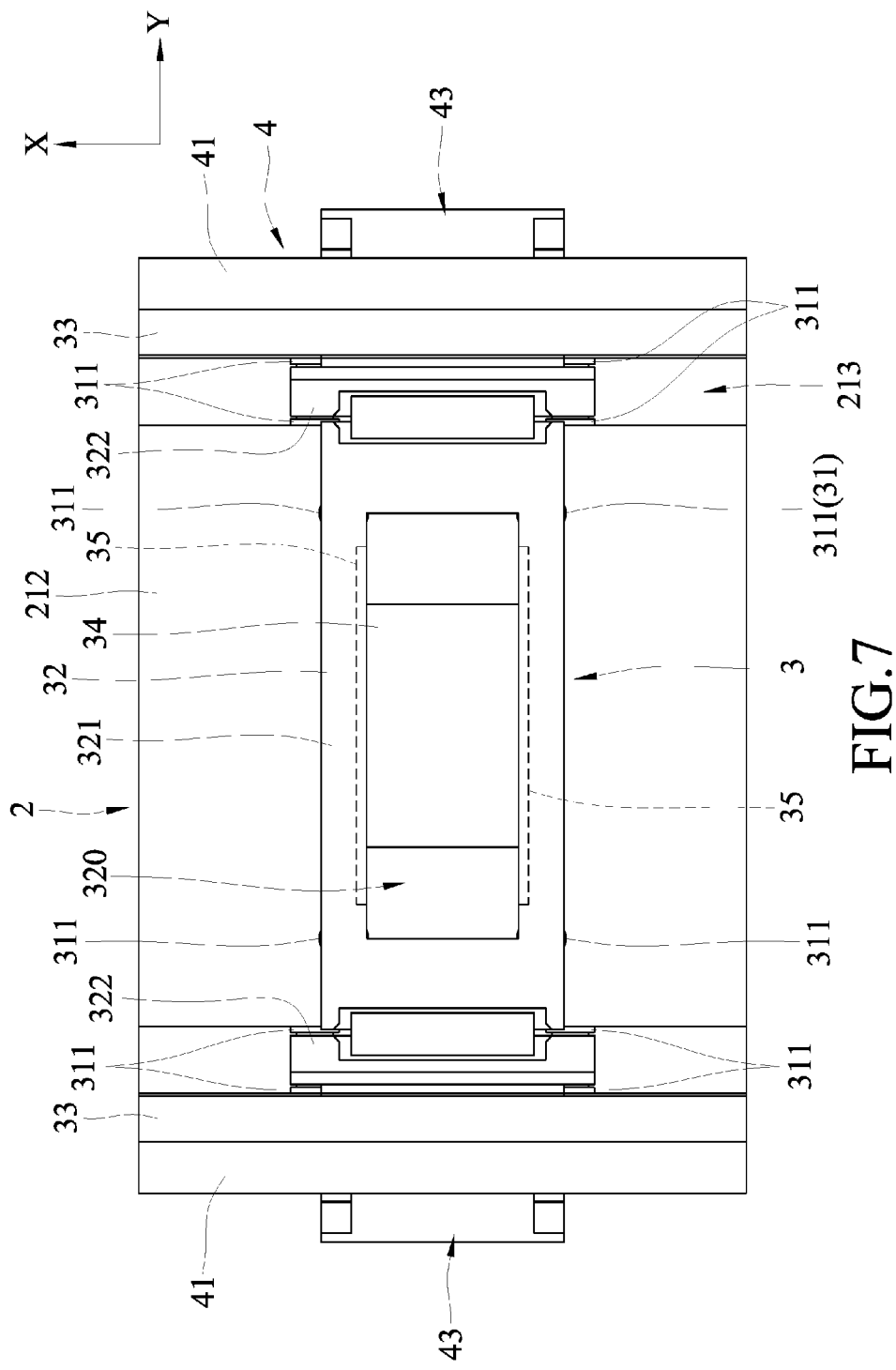
FIG. 7 is a schematic top view of the embodiment in FIG. 6.
Figure 8:
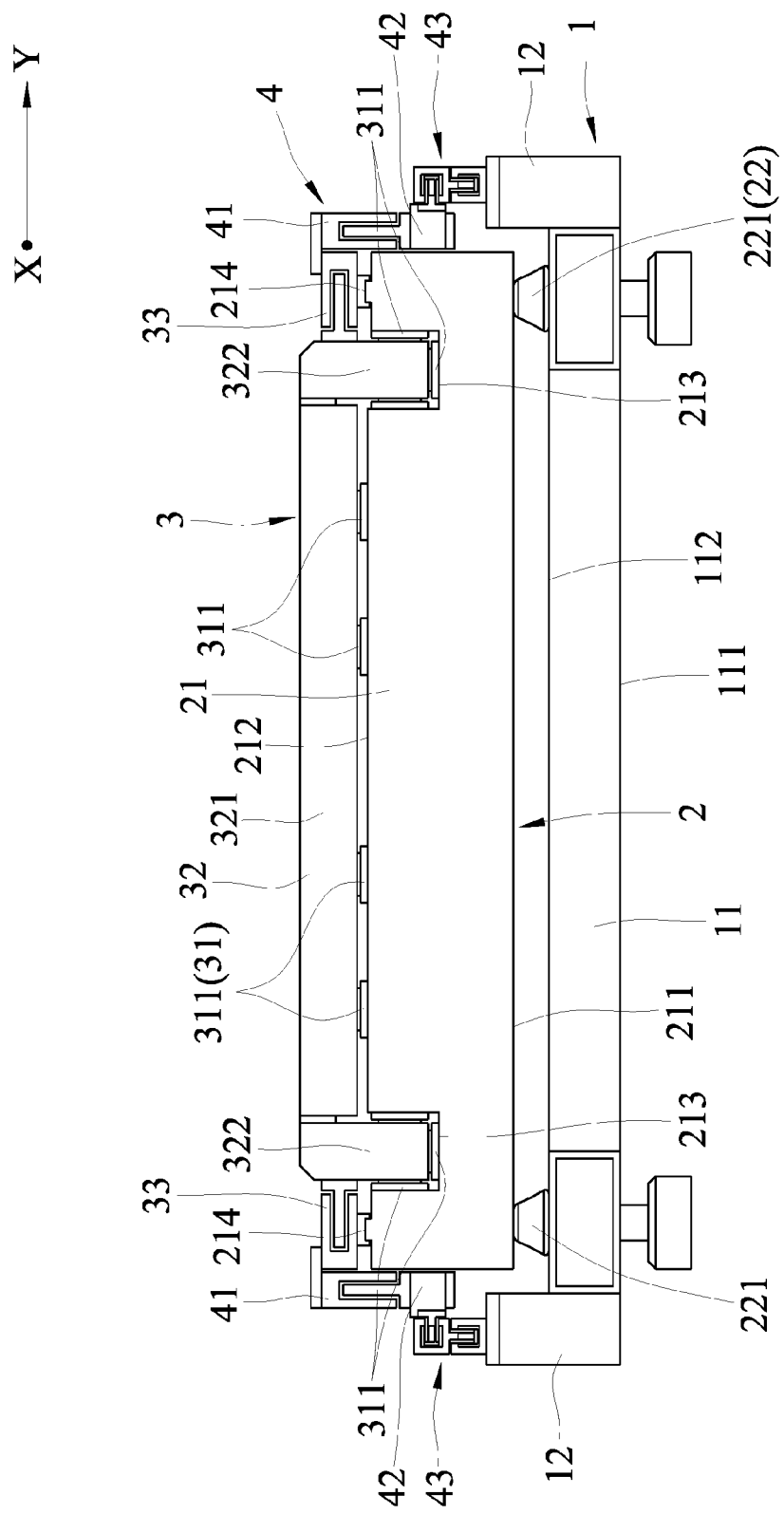
FIG. 8 is a schematic side view of the embodiment in FIG. 6.

Referring to FIGS. 6 to 8, in another embodiment, the reaction force counteracting unit 4 further includes two first damping assemblies 43, each disposed between the counteraction moving member 42 and the upright pedestal 12 of the base seat unit 1, and two second damping assemblies 44, each disposed on the respective counteraction actuating member 42. By means of the first and second damping assemblies 43, 44, part of the reaction force can be absorbed immediately while reinforcing the connection between the reaction force counteracting unit 4 and the base seat unit 1 so as to ensure stability of the device.

While the disclosure has been described in connection with what are considered the exemplary embodiments, it is understood that this disclosure is not limited to the disclosed embodiments but is intended to cover various arrangements included within the spirit and scope of the broadest interpretation so as to encompass all such modifications and equivalent arrangements.

What is claimed is:

1. A reaction force counteracting device comprising:
a base seat unit having a base seat;
a stage mounting unit having a mounting seat which is disposed above and spaced apart from said base seat in an upright direction, and a vibration isolating assembly which interconnects said mounting seat and said base seat;
a movable stage unit mounted on said mounting seat, and including a stage which is movable relative to said mounting seat, a primary actuating member which is disposed to actuate movement of said stage so as to generate a reaction force that is applied to said primary actuating member to make an accelerated displacement in an opposite direction relative to the movement of said stage, and a holding table which is coupled with said stage such that said holding table is movable with the movement of said stage and is movable relative to said stage;

a reaction force counteracting unit including at least one counteraction actuating member which is coupled with said primary actuating member, and at least one counteraction moving member which is disposed between said base seat unit and said counteraction actuating member and which is actuated by said counteraction actuating member to be moved in an opposite direction relative to the accelerated displacement of said primary actuating member so as to counteract the reaction force; and a control unit electronically connected with said primary actuating member and said counteraction actuating member, and disposed to read time-variant positional data of said primary actuating member with respect to said stage, and of said counteraction actuating member with respect to said counteraction moving member, process the positional data into acceleration data, and control movement of said counteraction actuating member in accordance with the acceleration data.

2. The reaction force counteracting device as claimed in claim 1, wherein said primary actuating member is disposed to actuate the movement of said stage in a first direction, said counteraction actuating member being disposed to actuate the movement of said counteraction moving member in the first direction, said movable stage unit including at least one secondary actuating member which is disposed on said stage and which actuates said holding table to make a movement in a second direction that is perpendicular to the first direction.

3. The reaction force counteracting device as claimed in claim 2, wherein said mounting seat has a lower wall confronting said base seat, an upper wall opposite to said lower wall, two sliding recesses extending from said upper wall toward said lower wall and in the first direction and disposed opposite to each other in the second direction, and two sliding rails projecting upwardly from said upper wall and disposed laterally of said sliding recesses, said stage having a stage body which defines a sliding space configured for accommodating and permitting movement of said holding table in the second direction, and two sliding blocks, each of which is connected to said stage body and slidably disposed in a respective one of said sliding recesses, said movable stage unit including two of said primary actuating members which are held on and slidable along said sliding rails, respectively, and which are respectively coupled with said sliding blocks of said stage.

4. The reaction force counteracting device as claimed in claim 3, wherein said movable stage unit includes an air bearing assembly which is disposed on said upper wall of said mounting seat such that said stage and said holding table are supported by said air bearing assembly to movably float above said upper wall.

5. The reaction force counteracting device as claimed in claim 1, wherein said primary actuating member and said counteraction actuating member are linear servo motors.

6. The reaction force counteracting device as claimed in claim 1, wherein said reaction force counteracting unit further includes a first damping assembly disposed between said counteract ion moving member and said base seat unit.

7. The reaction force counteracting device as claimed in claim 6, wherein said reaction force counteracting unit further includes a second damping assembly disposed on said counteraction actuating member.

* * * * *